United States Patent Office 2,922,704
Patented Jan. 26, 1960

2,922,704

PROCESS FOR THE MANUFACTURE OF COAL BRIQUETTES

Heinrich Dohmen, Deventer, Netherlands, assignor to N. V. Briko, The Hague, Netherlands, a limited liability company No Drawing. Application October 20, 1955
Serial No. 541,827

Claims priority, application Netherlands October 26, 1954

7 Claims. (Cl. 44—15)

In U.S. patent application Serial No. 502,219, now U.S. Patent No. 2,890,945, a process is described for the manufacture of briquettes, particularly fuel briquettes in which the starting material (e.g. a solid, more or less finely divided fuel) is intimately mixed with a conversion product which is prepared by treating one or more higher carbohydrates or carbohydrate ethers in finely divided dry condition with a concentrated liquid organic acid or an organic acid in gaseous or vapor form, and the mixture thereupon is heated, whereafter the material thus treated is molded by the application of pressure, and the briquettes thus obtained are dried. The drying may, if desired, take place with further heating.

As set forth in that application, the conversion product may be prepared by mixing the carbohydrate or carbohydrate ether in finely divided dry condition with a concentrated liquid organic acid, e.g. 80% acetic acid, and thereupon heating same, thus forming a finely divided solid final product at the chosen weight ratio of the carbohydrate or carbohydrate ether. The above-mentioned weight ratio may vary within wide limits, but very good results are obtained with a ratio of 5 to 10 parts by weight of carbohydrate (or carbohydrate ether) to 1 part by weight of the concentrated organic acid. Instead of the concentrated aqueous acid, organic acid in gaseous form may be brought in contact with the carbohydrate or its ether.

If, e.g., the acid is added to the carbohydrate under continuous stirring and, after at least a part of the acid has been added, the mixture is gradually heated until a temperature of approximately 120–200° C. has been reached, a product is obtained which immediately, that is to say in dry condition, may be added to coal dust. It is desirable that the coal dust has a moisture content lying at the upper limit of the proportions mentioned in the U.S. patent application Serial No. 482,399, now U.S. Patent No. 2,841,478, namely, approximately 20%. The optimum moisture content is namely strongly dependent on the kind of coal used, so that often a lower moisture content is also sufficient, whilst great care is to be paid to the mixing of the powder with the coal, since the powder evidently lacks the fluidity of an aqueous solution.

For the sake of completeness it is remarked that it has already been pointed out in the U.S. patent application Serial No. 482,400, now U.S. Patent No. 2,835,610, that conversion products obtained by treating carbohydrates and/or carbohydrate ethers in dilute organic acid solution may be brought into dry condition by evaporation, preferably under the exclusion of air. The application Serial No. 502,219, now U.S. Patent No. 2,890,945, however, is concerned with products which are prepared by treating the same starting material in dry condition with a concentrated organic acid or gaseous organic acid, whilst during at least a part of the treatment temperatures may be used higher than the boiling point of water. These products remain in the dry solid condition during the entire treatment.

Fuel briquettes which are manufactured in accordance with said process, in general give very good satisfaction. It has now appeared that whereas the fuels which are capable per se of coking more or less in the fire, satisfy all requirements made on briquettes in the briquette technique, briquettes manufactured from anthracite or lean coal, in one respect give less satisfaction than the briquettes manufactured from baking coal. Whilst the mechanical properties of the briquettes made from anthracite and lean coal, such as the resistance during transport, in the drum and during transference and the resistance against weather influences leave nothing to be desired, they do not entirely satisfy the usual requirements in the fire when poking; on the average a percentage of coal falls through the grid during poking which is higher than that which can be reached with other kinds of coal. This drawback can be eliminated in a simple manner by mixing the anthracite or lean coal before briquetting with a certain percentage of baking coal; it will be evident that the percentage of fuel which falls through the grid is dependent on the mixing proportion of the coal used and the above-mentioned requirements are satisfied by the addition of a reasonable amount of baking coal.

Surprisingly it has now been found that briquettes can be made by intimately mixing the starting material for the briquettes both with the conversion product of the carbohydrate or carbohydrate ether prepared in accordance with the process of U.S. patent application Serial No. 502,219, now U.S. Patent No. 2,890,945, and with a product obtained by heating brown coal with an organic liquid or gaseous acid. The carbohydrate or carbohydrate ether and the brown coal may be separately converted with the organic acid, or they may be previously mixed and thereupon be simultaneously subjected to the action of the organic acid.

As disclosed in said copending application, and also in earlier copending application Serial No. 482,400, now U.S. Patent No. 2,835,610, the carbohydrates or carbohydrate ethers serving as starting materials for the preparation of the conversion products used for the binding agents may include starch, dextrin, and tylose (a brand-name for cellulose ethers, such as, for example, methylcellulose and carboxymethyl cellulose). The organic acids used for the conversion may include acetic, propionic, butyric, oxalic, tartaric, and citric acids, and serve for conversion both of the carbohydrates or carbohydrates and the brown coal.

When manufacturing coal briquettes in general the amount to be used of the conversion product of carbohydrate (ethers) with organic acids can be reduced by the incorporation of the brown coal treated in the above described manner, which represents an economical advantage. For briquettes made from anthracite or lean coal the advantage is obtained, moreover, that while maintaining the above-mentioned favorable mechanical properties the percentage of coal falling through the grid during poking is reduced to a value which satisfies the usual requirements.

It has appeared that the above-described favorable result is not obtained when untreated brown coal is used. The crude brown coal in the condition is which it comes from the mine has a high moisture content. This moisture content, of course, can be reduced by heating, but the addition of a certain amount of a liquid or gaseous organic acid during heating brings the brown coal in a condition, in which it readily gives off water, whilst moreover the structure of the brown coal is affected in such a manner that after mixing with the carbohydrate conversion product and the addition to the coal it can be pressed to briquettes at a low pressure.

The treatment of the brown coal is preferably carried out by heating the crushed brown coal (particle size of the order of 1 mm.) at a temperature of at most about 200° C. while stirring well, whereupon during continued stirring and heating at this temperature a concentrated solution of an organic acid is added. Preferably approximately 4 ccm. of 80% acetic acid per kilogram of brown coal is added. When nearly all the acetic acid has been added, the heating may, if desired, be stopped.

The amount of the mixture of conversion products which is added to the starting material for the briquettes may be varied within wide limits dependent on the kind of coal used, and in case of mixtures of different kinds of coal, on the mixing proportion applied. The larger the amount of conversion products added, the higher are in general the values for the mechanical properties determined according to the usual tests. An added amount of 3% of conversion product is sufficient to press any kind of coal, also anthracite or lean coal, to briquettes which satisfy all requirements. It is preferred to use a somewhat larger amount of the converted carbohydrate than of the treated brown coal. A good example is 1.65% by weight of the converted carbohydrate and 1.35% by weight of the converted brown coal. However, also a small amount of solid wax may be added, and then preferably 1.55% by weight of the converted carbohydrate, 1.25% by weight of the treated brown coal and 0.2% by weight of solid wax are used. During briquetting circumstances are, of course, applied in which the solid wax passes into the molten condition.

Although no theoretical explanation of the phenomena observed will be given, it is thought that the present process is indispensible for briquetting coal which has no "rest baking" capacity, i.e. which has not the capacity of sintering or coking in the fire. As appears from what is said above, the process is not restricted to any particular kind of coal, but in general improves all mechanical properties of the briquettes made therewith. In those cases in which the usual requirements already are met or surpassed without the use of the treated brown coal, the process has an exclusively economical value, because the amounts of carbohydrate conversion product used for briquetting can be reduced.

What is claimed is:

1. A process of manufacturing coal briquettes which which comprises intimately mixing comminuted coal with about 3% by weight of a mixture consisting of a conversion product prepared by reacting a material selected from the group consisting of starch, dextrin, methyl cellulose and carboxy methyl cellulose in finely divided dry state at a temperature of at most 200° C. with acetic acid, and a conversion product prepared by reacting brown coal at a temperature of at most 200° C. with acetic acid, molding the mixture of coal and mixed conversion products thus obtained while still hot into briquette form by the application of pressure, and drying the resultant briquettes.

2. The process of claim 1, wherein the acetic acid is employed in concentrated liquid form.

3. The process of claim 1, wherein the aliphatic carboxylic acid is employed in vapor form.

4. The process of claim 1, wherein the comminuted coal has no "rest coking" capacity.

5. The process of claim 1, wherein the mixture of conversion products is obtained by simultaneously reacting the brown coal and the material selected from the group consisting of starch, dextrin, methyl cellulose and carboxy methyl cellulose in finely divided dry state with the acetic acid.

6. The process of claim 2 in which the acid is 80% acetic acid.

7. The process of manufacturing coal briquettes which comprises intimately mixing comminuted coal with a mixture of (a) about 1.65% by weight of a conversion product prepared by reacting at a temperature of at most 200° C. a carbohydrate selected from the group consisting of starch and dextrin in finely divided dry state with acetic acid, and (b) about 1.35% by weight of a conversion product prepared by heating at a temperature of at most 200° C. brown coal with acetic acid, molding the mixture of coal and mixed conversion products thus obtained while still hot into briquette form by the application of pressure, and drying the resultant briquettes.

References Cited in the file of this patent

UNITED STATES PATENTS 1,851,689    Wolf _____ Mar. 29, 1932

FOREIGN PATENTS 283,269    Great Britain _____ Jan. 5, 1928

OTHER REFERENCES

"Adhesion and Adhesives," De Bruyne-Houwink (1951), Amsterdam, Elsevier Pub. Co., p. 189.